US010159919B2

(12) United States Patent
Almasian et al.

(10) Patent No.: US 10,159,919 B2
(45) Date of Patent: Dec. 25, 2018

(54) FILTER ALIGNMENT DEVICE

(71) Applicant: EMD Millipore Corporation, Burlington, MA (US)

(72) Inventors: Joseph Almasian, Westford, MA (US); Jeremy Perreault, Leominster, MA (US); Martin Szyk, Worcester, MA (US)

(73) Assignee: EMD Millipore Corporation, Burlington, MA (US)

( * ) Notice: Subject to any disclaimer, the term of this patent is extended or adjusted under 35 U.S.C. 154(b) by 985 days.

(21) Appl. No.: 14/451,524

(22) Filed: Aug. 5, 2014

(65) Prior Publication Data

US 2014/0339146 A1 Nov. 20, 2014

Related U.S. Application Data

(63) Continuation of application No. 11/654,951, filed on Jan. 18, 2007, now Pat. No. 8,801,925.

(60) Provisional application No. 60/771,606, filed on Feb. 9, 2006.

(51) Int. Cl.
*B01D 35/30* (2006.01)
*B01D 27/08* (2006.01)
*B01D 27/00* (2006.01)
*B01D 29/15* (2006.01)

(52) U.S. Cl.
CPC ........... *B01D 35/306* (2013.01); *B01D 27/00* (2013.01); *B01D 27/08* (2013.01); *B01D 29/15* (2013.01); *B01D 35/30* (2013.01); *B01D 2201/291* (2013.01); *B01D 2201/302* (2013.01); *B01D 2201/4046* (2013.01);
(Continued)

(58) Field of Classification Search
USPC ........................................................ 210/232
See application file for complete search history.

(56) References Cited

U.S. PATENT DOCUMENTS 2,873,029 A  2/1959  Humbert, Jr.
2,966,990 A  1/1961  Sicard
(Continued)

FOREIGN PATENT DOCUMENTS

BE  1011567 A3  11/1999
CN  1201442 A  12/1998
(Continued)

OTHER PUBLICATIONS

Extended European Search Report received for EP Patent Application No. 10179130.9, dated Nov. 17, 2010, 6 pages.
(Continued)

*Primary Examiner* — Thomas M Lithgow
(74) *Attorney, Agent, or Firm* — EMD Millipore Corporation

(57) ABSTRACT

A removable device that ensures that the port of a filter cartridge is liquid tightly sealed to the port of the head of a housing even when there is insufficient room beneath the bowl to allow one to physically secure the cartridge port to the head port before securing the head and bowl together. The invention uses one or more removably attached alignment devices to center the cartridge in the bowl and maintain it at a height sufficient to ensure that the two ports are aligned and liquid tightly sealed to each other when the bowl and head are mated together.

7 Claims, 8 Drawing Sheets

(52) U.S. Cl.
CPC .. *B01D 2201/4084* (2013.01); *B01D 2313/02* (2013.01); *B01D 2313/44* (2013.01)

(56) References Cited

U.S. PATENT DOCUMENTS

| | | | |
|---|---|---|---|
| 2,988,227 A * | 6/1961 | Harms | B01D 29/21 |
| | | | 210/493.2 |
| 3,684,100 A | 8/1972 | Close | |
| 3,692,186 A | 9/1972 | Marzocchi | |
| 3,696,933 A | 10/1972 | Pall et al. | |
| 5,685,985 A | 11/1997 | Brown et al. | |
| 5,879,560 A | 3/1999 | Seeley et al. | |
| 5,891,334 A | 4/1999 | Gundrum et al. | |
| 5,985,144 A | 11/1999 | Janik et al. | |
| 6,347,712 B1 | 2/2002 | Mees et al. | |
| 6,533,933 B1 | 3/2003 | Stankowski et al. | |
| 6,635,175 B2 | 10/2003 | Stankowski | |
| 6,830,683 B2 | 12/2004 | Gundrum et al. | |
| 6,926,827 B2 | 8/2005 | Gruca et al. | |
| 2002/0060183 A1 | 5/2002 | Paul et al. | |
| 2003/0196947 A1 | 10/2003 | Gundrum et al. | |
| 2004/0159600 A1 | 8/2004 | Stankowski | |
| 2004/0237575 A1 | 12/2004 | Stockbower | |
| 2005/0178713 A1 | 8/2005 | Stockbower | |

FOREIGN PATENT DOCUMENTS

| | | |
|---|---|---|
| CN | 1529628 A | 9/2004 |
| CN | 1642614 A | 7/2005 |
| DE | 4330840 C1 | 2/1995 |
| JP | 3-56189 A | 3/1991 |
| JP | 2004-531392 A | 10/2004 |
| JP | 2004-535291 A | 11/2004 |
| TW | 200402319 A | 2/2004 |
| WO | 2003/002229 A1 | 1/2003 |

OTHER PUBLICATIONS

Extended European Search Report received for EP Patent Application No. 07102040.8, dated May 3, 2007, 6 pages.

* cited by examiner

FILTER ALIGNMENT DEVICE

PRIORITY DATA

This application is a continuation of U.S. patent application Ser. No. 11/654,951, filing date Jan. 18, 2007, which claims the benefit of priority of U.S. Provisional Patent Application No. 60/771,606, filing dated Feb. 9, 2006, each of which is incorporated by reference herein, in its entirety.

FIELD OF INVENTION

The present invention relates to a filter cartridge alignment device. More particularly it relates to an alignment device for filter cartridges within a bowl type housing.

BACKGROUND OF THE INVENTION

Many filter cartridges are designed to be expendable and fit into a reusable housing 1. The housing 1, typically made of stainless steel or plastic, generally contains a head 2 and a bowl 4 as shown in FIG. 1 and a disposable filter cartridge 6 inside the bowl 4 with a neck or port 8 of the cartridge 6 liquid tightly sealed to a port 10 of the head 2. The head 2 and howl 4 are capable of being removably mated to each other, generally through the use of corresponding male and female threads 12 and 14 (as shown in FIG. 1) although other means such as snap fittings, bayonet fittings and the like can and have been used. The head 2 of the housing 1 contains a second port 16. One port of the head 2, either 10 or 16, depending on the flow configuration of the system is the inlet for fluid (gas or liquid) into the housing and filter and the other port 16 or 10 respectively, becomes the outlet. Traditionally fluid enters such a housing through port 16, then through the filter to the filter port 8 and then out through the head port 10. A drain plug 5 is generally contained in the bottom of the bowl to allow for draining of the bowl if necessary.

Traditionally, to assemble the filter system as shown in FIG. 1, one liquid tightly seals the port 8 of the cartridge 6 into the port 10 of the head 2 via the O-rings 9 secured to the outer surface 11 of the port 8, then one places the bowl 4 under the cartridge 6 raising it up until the head 2 and bowl 4 meet and then securing the head 2 and bowl 4 together. The O-rings form a friction fit between the ports 8, 10 providing a liquid tight seal between the ports 8, 10.

Problems exist however when the housing 1 is located in a position such that the bowl 4 has insufficient room to be placed under the cartridge 6 that has already been secured to the head 2. Such circumstances exist when the housing is adjacent to the floor or another component of the filtration system. In these instances, one generally places the cartridge 6 in the bowl 2, aligns the bowl 2 and cartridge 6 under the head 2, drops the bowl 4 down to the furthest extent possible and then seizes the cartridge 6 to seal it into the head 2. Often the seal between the port 8 of the cartridge and the port 10 of the head 2 is less than adequate. Several new housing designs have been offered to secure the cartridge within the housing before and after assembly, see U.S. Pat. No. 6,533, 933 B1, to overcome this issue. In this design, either the cartridge and bowl are specifically redesigned to provide the required mating devices with in them (such as lugs on the cartridge and slots in the bowl inner surface into which the lugs fit) or at least the howl is modified to accept a lockable fitting that is attached to an existing cartridge.

However, thousands of housings still exist that have not been replaced with the new bowl/cartridge design. The present invention provides a device for ensuring that the port 8 of the cartridge is aligned and suitably sealed into the port 10 of the head 2 without the need to permanently replace or modify the cartridge and in most embodiments the housing as well.

SUMMARY OF THE INVENTION

The present invention relates to a removable device that ensures that the port of the cartridge is liquid tightly sealed to the port of the head of a housing even when there is insufficient room beneath the bowl to allow one to physically secure the cartridge port to the head port before securing the head and bowl together.

The present invention uses one or more alignment devices to center the cartridge in the bowl and at a height sufficient to ensure that the two ports are aligned and liquid tightly sealed to each other when the bowl and head are mated together.

A first embodiment is comprised of a cap that fits over the port of the cartridge and liquid tightly mates with the port of the head of the housing. The device is of a height sufficient to ensure that the two ports are liquid tightly sealed together when the bowl and head are mated together. Additionally, the device of sufficient width to ensure that the cartridge sits centered in the housing, to ensure proper alignment and liquid tight sealing of the two ports.

A second embodiment uses an alignment device secured to the far end of the cartridge from the end containing the port. In this embodiment, the device fits onto the endcap or body adjacent the endcap nearest the bottom of the bowl. This raises the existing port of the cartridge upward ensuring a good seal with the port of the head. Additionally, the device either is of a width or has flanges, wings or other such devices extending from it at a width that ensures the cartridge is concentrically and/or axially aligned such that the two ports are aligned for sealing.

A third embodiment uses an alignment device similar to that of the second embodiment except that the width of the device or any of its features does not provide vertical alignment or centering of the cartridge with the port of the head. This embodiment adds a second alignment device that is releasably secured to the body of the cartridge somewhere along its length intermediate between the end adjacent the bottom and the end adjacent the port. This second device provides the centering capabilities to the system ensuring the cartridge and head port are in vertical alignment.

A fourth embodiment uses the alignment device of the second embodiment and adds a second alignment device that is releasably secured to the body of the cartridge somewhere along its length intermediate between the end adjacent the bottom and the end adjacent the port. This second device provides additional centering capabilities to the system ensuring concentric and/or axial alignment between the ports.

All of the above embodiments are preferably releasably secured to the cartridge through friction fitting, snap fittings and the like so they can be added to existing cartridges. Alternatively, the device(s) can be permanently attached to the cartridge or one of its components such as an endcap or molded sleeve if desired. The device(s) can be permanently attached in a variety of ways including but not limited to solvent bonding, overmolding, adhesive bonding, heat or ultrasound bonding and the like.

It is an object of the present invention to provide an alignment device for filter cartridges comprising a base capable of being removably attached to an upper or lower surface of a filter cartridge, said base being of a height sufficient to cause the filter cartridge to seat in a housing head when assembled and of a width sufficient to center the cartridge within a housing bowl when assembled.

It is an object of the present invention to provide a filter cartridge having a porous cartridge body, a porous core and a filter material between the body and the core, a first endcap liquid tightly sealed to a first end of the body and a first end of the core, a second endcap having an opening alignable with the core, the second endcap being liquid tightly sealed to a second end of the body and the opening being liquid tightly sealed to the core such that fluid entering the porous cartridge body must flow through the filter material before reaching the core and must flow through the core before reaching the opening, the improvement wherein one or more removably attached alignment devices secured to one or more portions of the body such that when the cartridge with the alignment devices are placed into a bowl-type housing, the cartridge is centered within the bowl and is of a height sufficient to ensure a liquid tight mating of the opening of the second endcap with a corresponding opening in the housing by the one or more alignment devices.

It is an object of the present invention to provide a filter cartridge having a porous cartridge body, a porous core and a filter material between the body and the core, a first endcap liquid tightly sealed to a first end of the body and a first end of the core, a second endcap having an opening alignable with the core, the second endcap being liquid tightly sealed to a second end of the body and the opening being liquid tightly sealed to the core such that fluid entering the porous cartridge body must flow through the filter material before reaching the core and must flow through the core before reaching the opening, the improvement wherein one or more removably attached alignment devices secured to one or more portions of the body such that when the cartridge with the alignment devices are placed into a bowl-type housing, the cartridge is centered within the bowl and is of a height sufficient to ensure a liquid tight mating of the opening of the second endcap with a corresponding opening in the housing by the one or more alignment devices.

It is an object of the present invention to provide a filter cartridge having a porous cartridge body, a porous core and a filter material between the body and the core, a first endcap liquid tightly sealed to a first end of the body and it first end of the core, a second endcap having an opening aligned with the core, the second endcap being liquid tightly sealed to a second end of the body and the opening being liquid tightly sealed to the core such that fluid entering the porous cartridge body must flow through the filter material before reaching the core and must flow through the core before reaching the opening, and one or more removably attached alignment devices secured to one or more portions of the body such that when the cartridge with the alignment devices are placed into a bowl-type housing, the cartridge is centered within the bowl, is of a height sufficient to ensure a liquid tight mating of the opening of the second endcap with a corresponding opening in the housing and is retained in such mating position during operation by the one or more alignment devices.

It is an object of the present invention to provide a filter housing formed of a bowl and a head to which the bowl can be removably mated, the head having a port for receipt of a port of a filter cartridge in a liquid tight manner, a filter cartridge having an outer porous body, a first closed endcap on a first end of the body, a second endcap having a cartridge port extending outwardly therefrom, the second endcap being liquid tightly sealed to a second end of the body, the improvement comprising an alignment device removable and liquid tightly sealed to the second endcap body of the cartridge, the one or more alignment devices providing the cartridge with a height and centering alignment within the bowl sufficient to ensure the liquid tight seal between the port of the head and the alignment device when the bowl and head are mated.

It is an object of the present invention to provide an alignment device suitable for mounting a membrane cartridge in a housing structure, the device having a support ring having an interior and exterior diameter lying in a plane of the ring, wherein the interior diameter is greater than the membrane cartridge, and the exterior diameter is less than the housing structure; and wherein the support ring comprises at least one member projecting from the plane of the ring wherein the member comprises a lip which interlocks with the membrane cartridge.

IN THE DRAWINGS

DETAILED DESCRIPTION OF THE INVENTION

Figure 1:
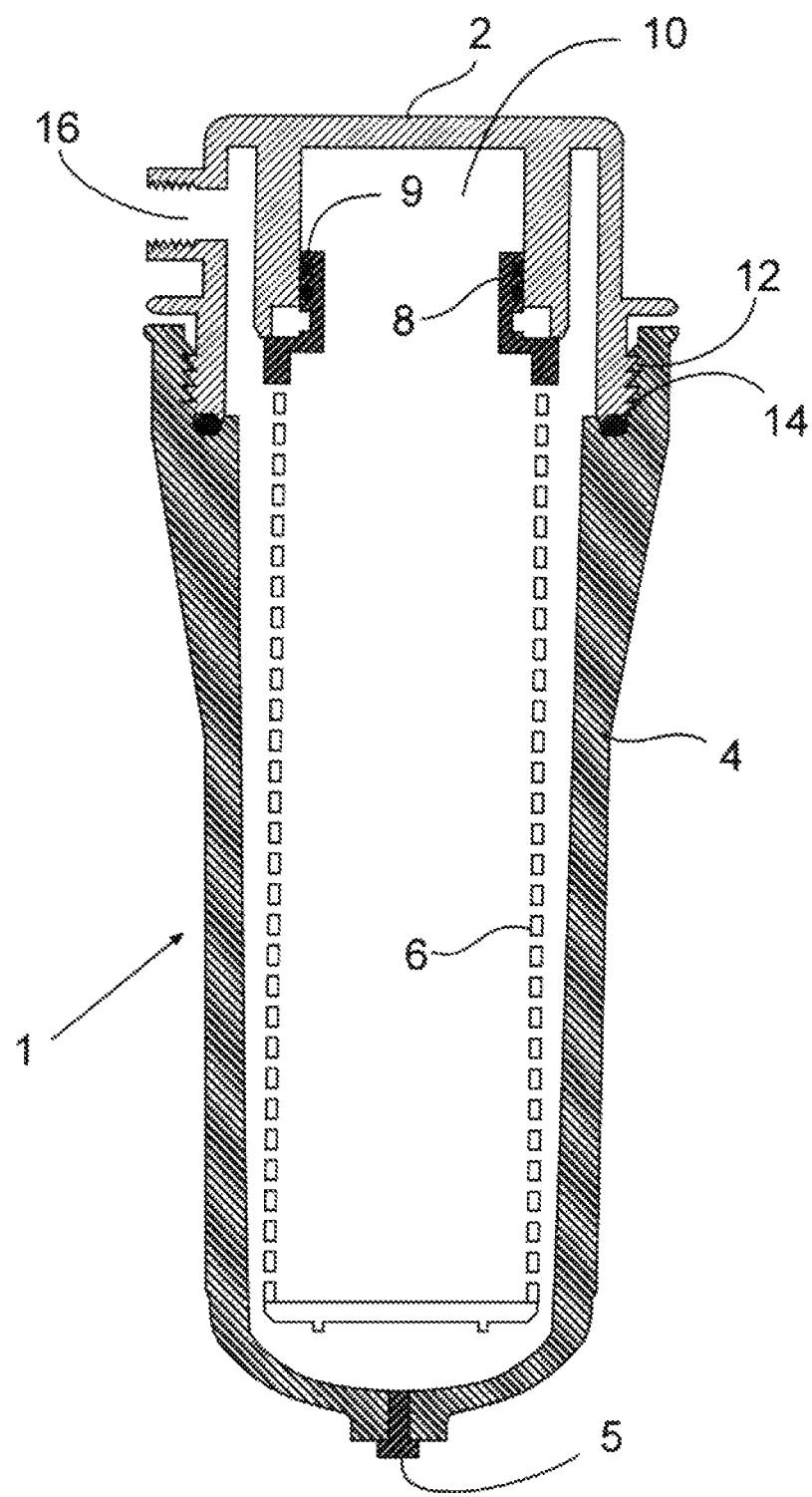
FIG. 1 shows a housing and cartridge of the prior all in cross-sectional view.
Figure 2:
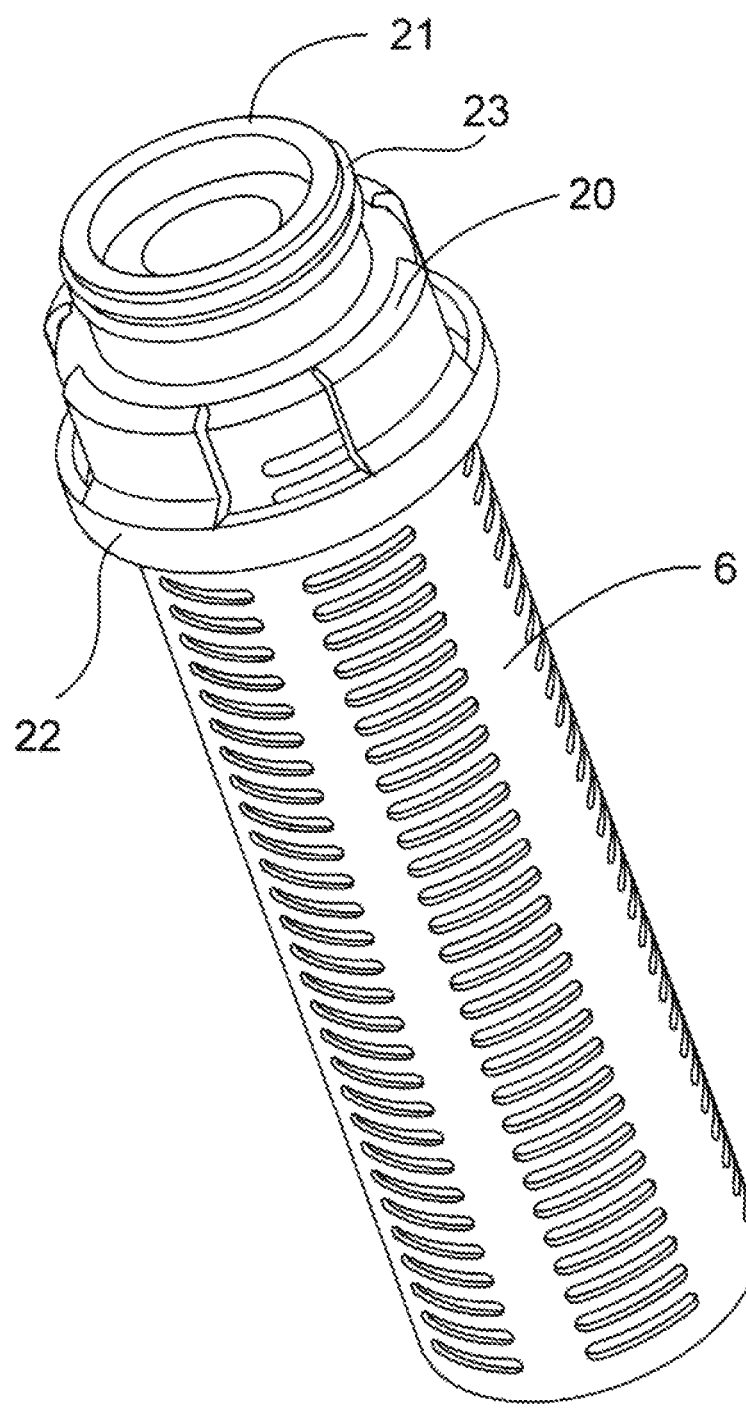
FIG. 2 shows a cartridge containing a first embodiment of the present invention in a planar view.
Figure 3:
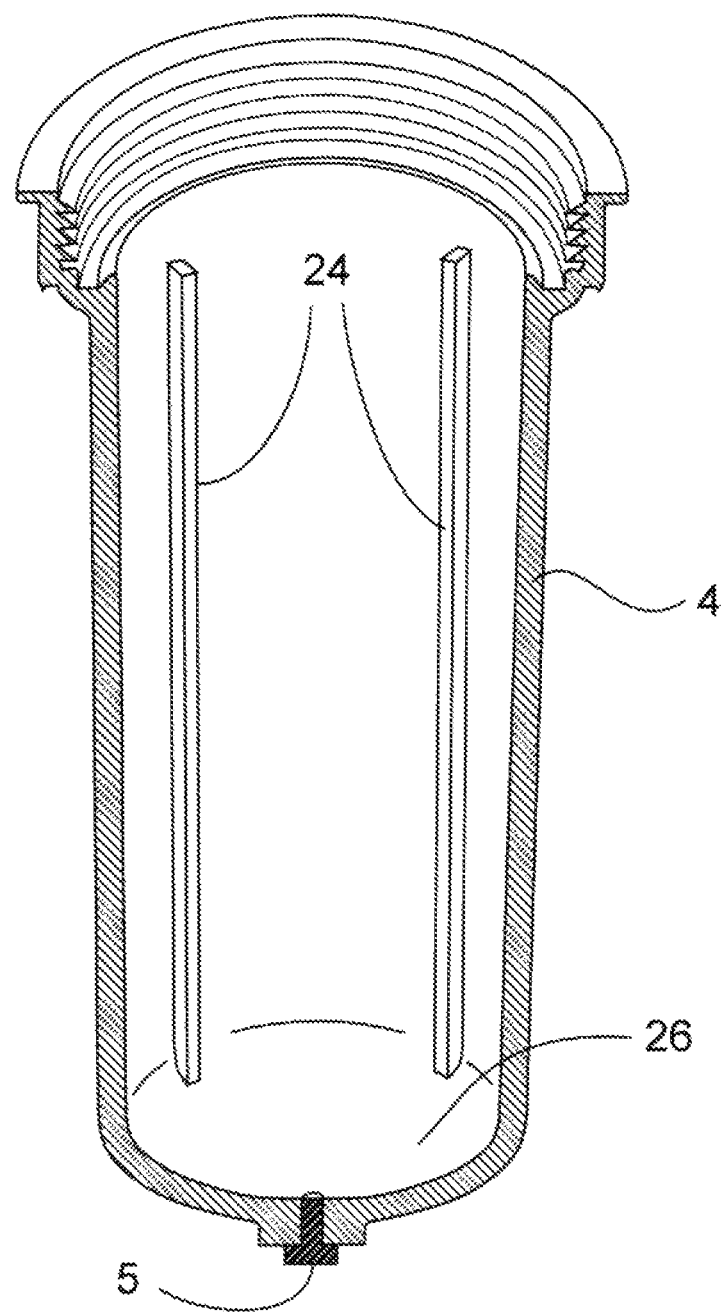
FIG. 3 shows a cartridge housing bowl of a first embodiment of the present invention in a planar view.
Figure 4:
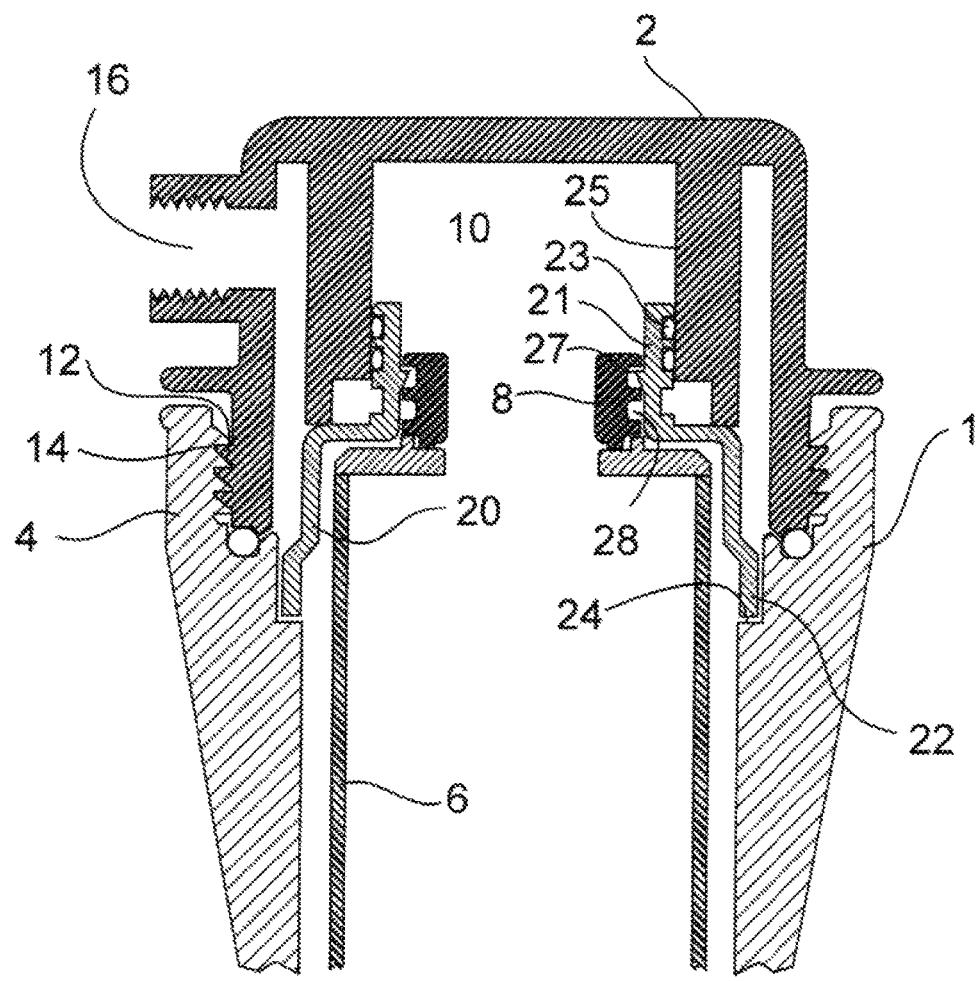
FIG. 4 shows the housing and cartridge containing the first embodiment of the present invention in cross-sectional view.

FIGS. 2-4 show a first embodiment of the present invention. An adapter or alignment device 20 is shown in FIG. 2 mounted to the cartridge 6 adjacent its port 8 (See FIG. 4). The device 20 fits over the port 8 of the cartridge 6 and liquid tightly mates with the port 10 of the head 2 of the housing 1 as shown in FIG. 4. The device 20 adds a height to the cartridge sufficient to ensure that the two ports 8, 10 are liquid tightly scaled together when the bowl 4 and head 2 are mated together. Additionally, the device 20 has a portion 22 of sufficient width to ensure that the cartridge sits centered of the ribs 24 (FIGS. 3 and 4) in the bowl 4 to ensure proper alignment and liquid tight sealing of the two ports 8, 10. The device 20 has a neck portion 21 containing a series of O-rings 23 that are designed to frictionally fit with the inner surface 25 of the head 2

As can be seen in FIG. 3, the bowl 4 has a series of ribs 24 formed in its sides extending from near or at the bottom 26 of the bowl 4 to a position adjacent the top of the bowl 4. The top inner surface of the 4 contain series of threads 14 design to mate with corresponding threads 12 of the head 2 (see FIG. 4).

The device 20 may be removably secured to the port 8 and/or top of the cartridge by a variety of mechanical devices. For example, as shown in FIG. 4, the inner surface of the device's neck 21 has a tab 27 that can interface with groove 28 of the cartridge which normally contains an O-ring far sealing against the head 2. Alternatively one may keep the O-rings in the grooves 28 and use friction fit between the inner surface of the device and the O-rings of the cartridge to hold them together. The device can also contain clips along its length (not shown) which attach to the cartridge. Other such mechanical devices would be obvious to one of ordinary skill in the art as well.

Figure 5:
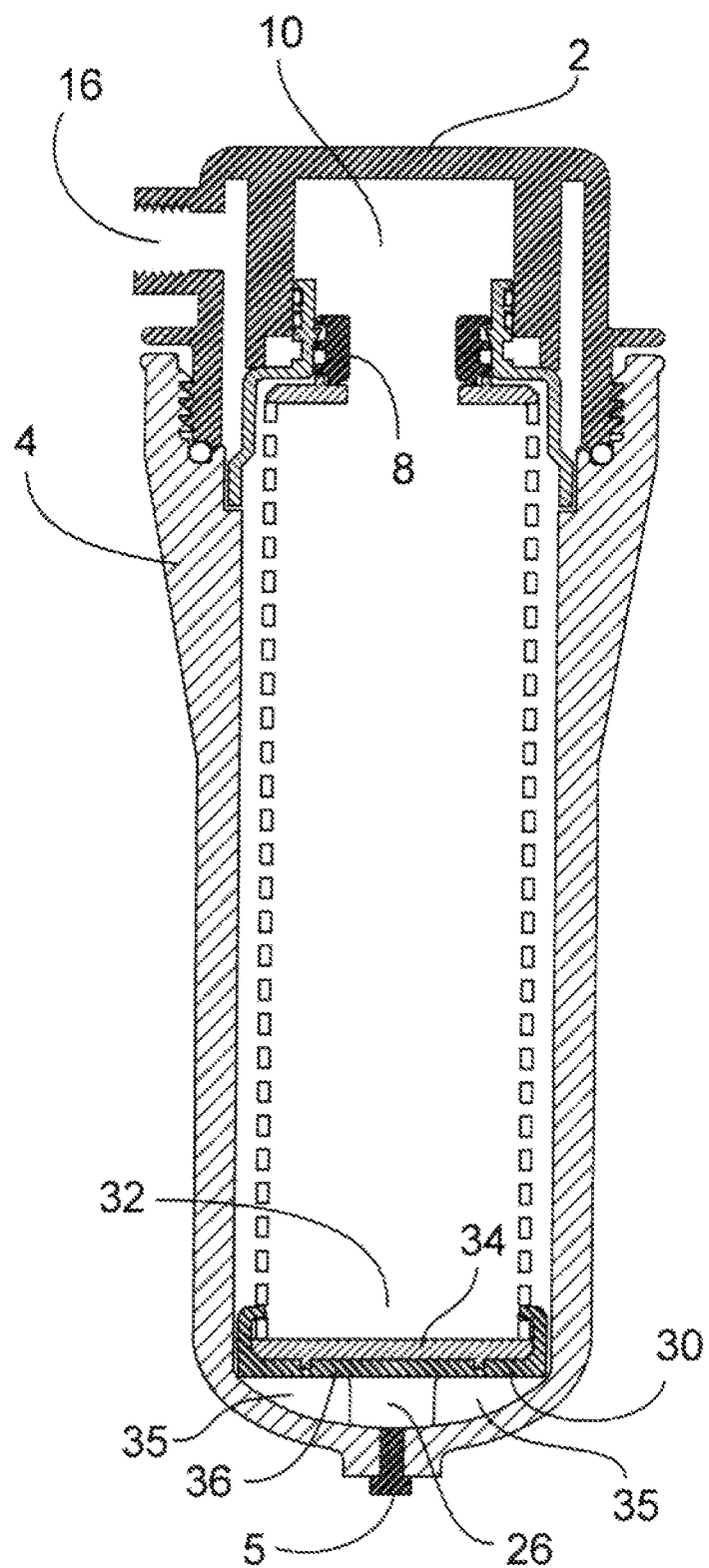
FIG. 5 shows a housing and cartridge containing a second embodiment of the present invention in cross-sectional view.

A second embodiment shown in FIG. 5 uses an alignment device 30 secured to the far end 32 of the cartridge 6 from the end containing the port 8. In this embodiment, the device 30 fits onto the endcap 34 or cartridge body adjacent the endcap 34 which is nearest the bottom of the howl 26. This device 30 rests on a series of ribs 35 so that the existing port 8 of the cartridge is driven upward relative to its position in the bowl 4 as the bowl 4 is attached to the head 2, ensuring a good seal with the port 10 of the head 2. Additionally, the device 30 either is of a width or has flanges, wings or other such devices 36 extending from it at a width that ensures the cartridge 6 is concentrically aligned within the bowl 4 such that the two ports 8, 10 are aligned for proper sealing.

Figure 6:
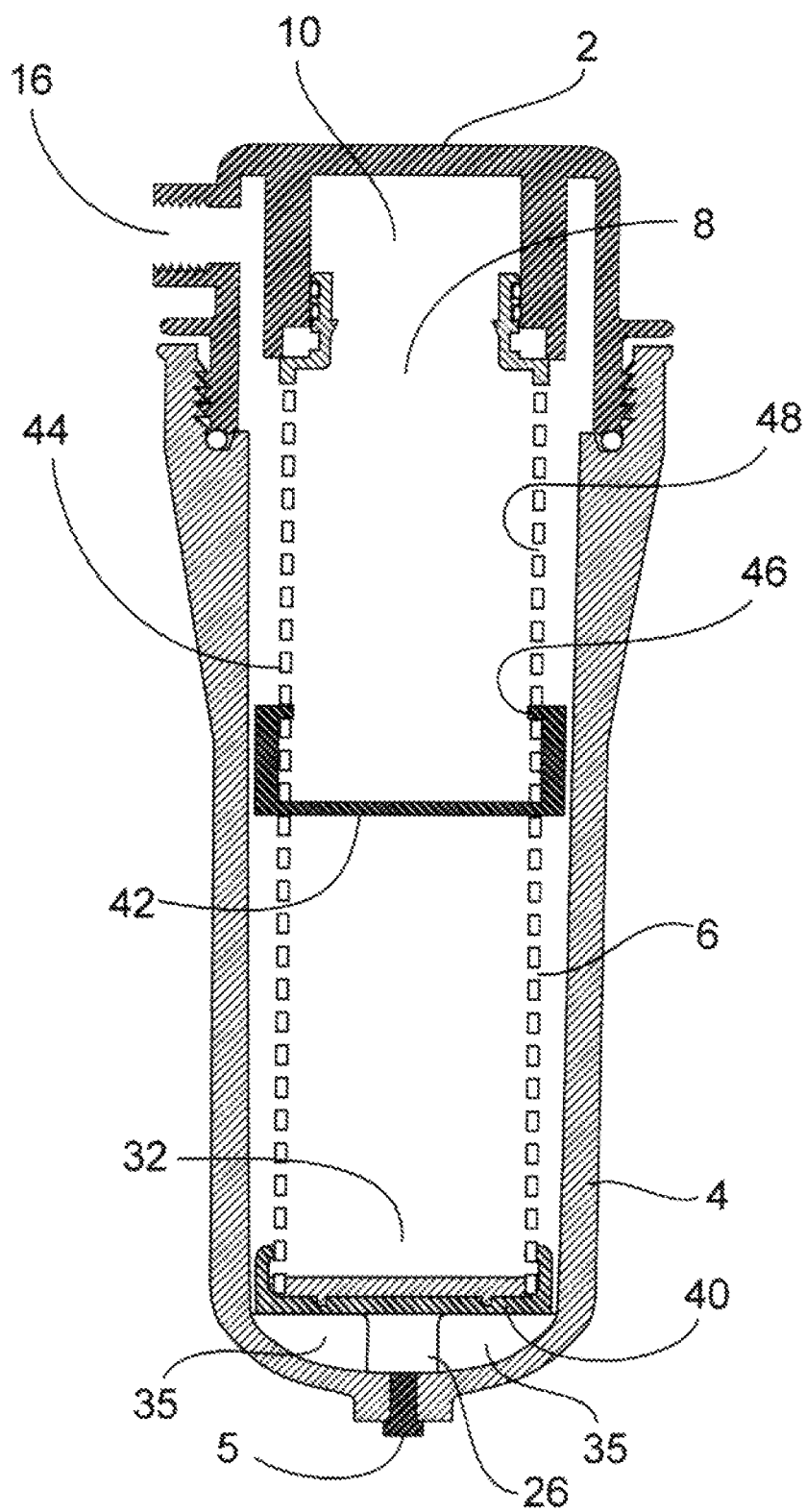
FIG. 6 shows a housing and cartridge containing a third embodiment of the present invention in cross-sectional view.

A third embodiment shown in FIG. 6 uses an alignment device 40 similar to that of the second embodiment except that the width of the device or any of its features does not provide vertical alignment or centering of the cartridge 6 with the port. 10 of the head 2. This embodiment adds a second alignment device 42 that is releasably secured to the body 44 of the cartridge 6 somewhere along its length intermediate between the end 32 adjacent the bottom and the end adjacent the port 8. This second device 42 provides the centering capabilities to the system ensuring the cartridge port 8 and head port 10 are in concentric alignment.

The second device 42 may be removably secured tar the cartridge 6 by a variety of mechanical devices. For example, as shown in FIG. 6, the second device 42 has one or more clips 46 which attach to the body 44 of the cartridge 6, generally by inserting into one or more of the openings 48 formed in the body 44 through which fluid flows into or out of the cartridge 6. Preferably, two or more, more preferably three or more, most preferably three discontinuous clips can be used. Alternatively, a single continuous clip maybe used not shown). In using multiple discontinuous clips, it is preferred that they spread evenly apart from one another around the circumference of the device 42. Alternatively one may use one or more O-rings in grooves formed on the inner surface of the second device (not shown) to create a friction fit between the inner surface of the second device 42, and the body 44 of the cartridge to hold them together. One could also simply use a resilient plastic that would allow for a three fit between the device 42 and the body 44. Other such mechanical devices would be obvious to one of ordinary skill in the art as well.

Figure 7:
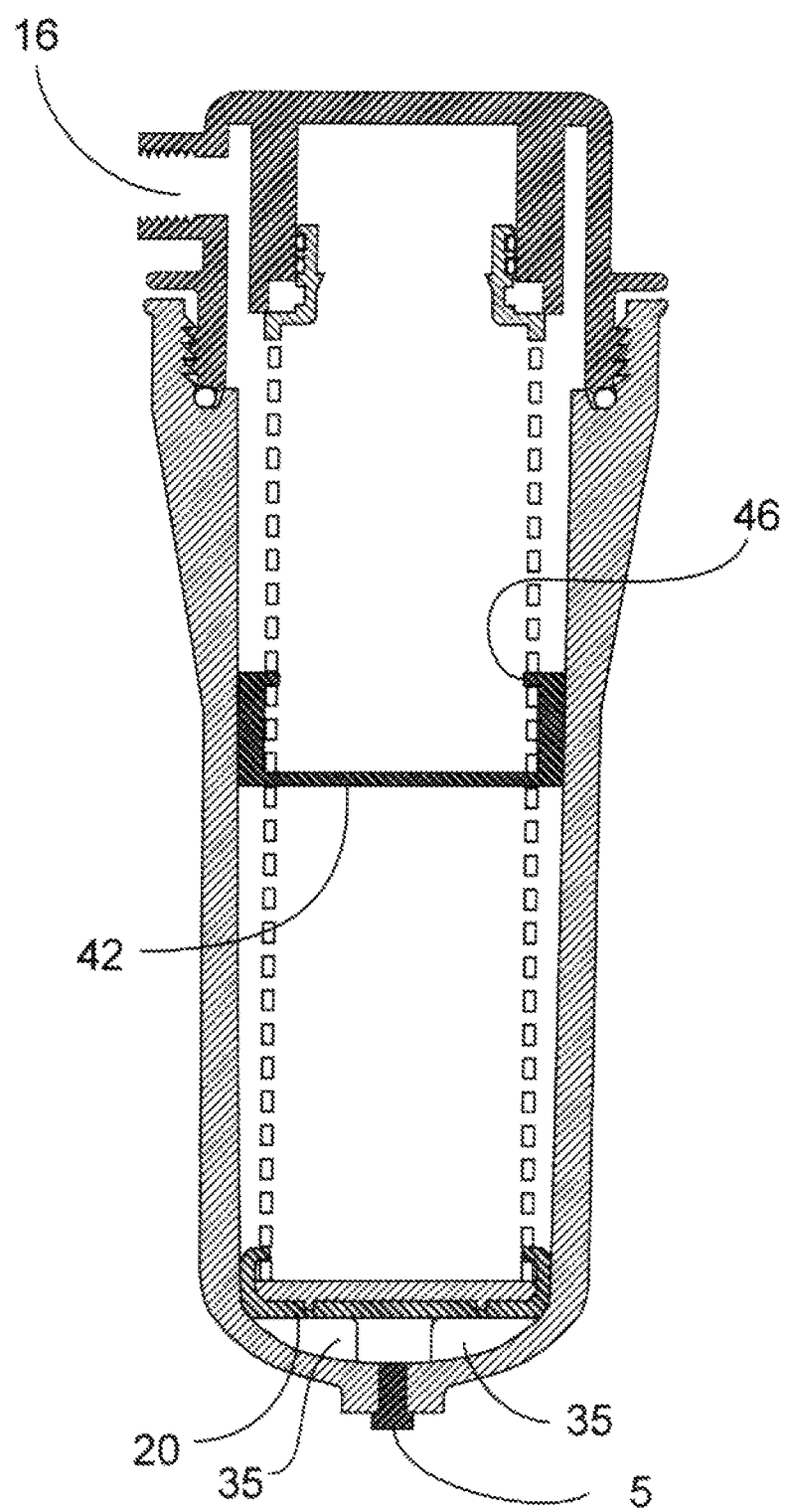
FIG. 7 shows a housing and cartridge containing a fourth embodiment of the present invention in cross-sectional view.

A fourth embodiment shown in FIG. 7 uses the alignment device 20 of the second embodiment and adds the second alignment device 42 of the third embodiment. Both devices align the cartridge in the howl 4 and the first element 20 also raises the port 8 of the cartridge 6 within the howl 4 to ensure a liquid tight seal between the ports 8, 10 when the howl and head 2 are mated together.

While the second device 42 is shown as depending downwardly along, the length or vertical axis of the cartridge 6 in the Figures, it can just as easily be arranged such that it holding elements such as the clips 46 are downward most.

Figure 8A:
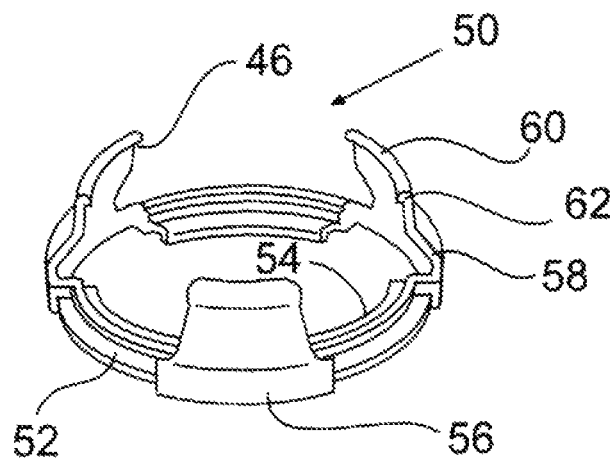
FIG. 8A shows a bottom alignment device according to the present invention in planar view.
Figure 8B:
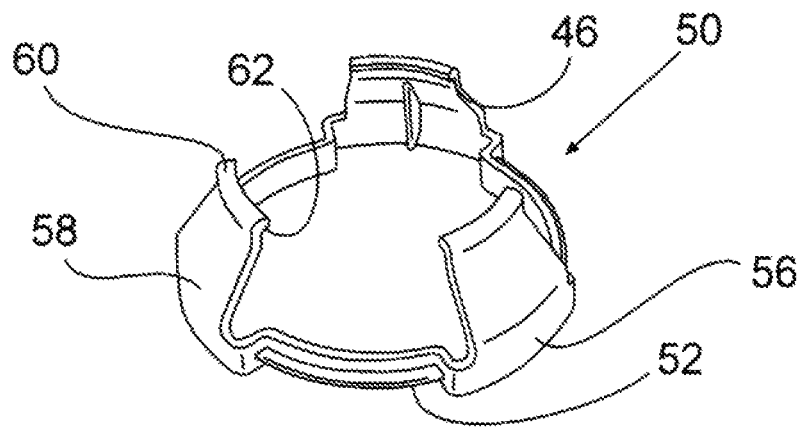
FIG. 8B shows an alignment device for use on the length of the cartridge according to the present invention in planar view.

FIGS. 8A and 8B show alignment devices according to the present invention by itself. The device 50 as shown could be used as either the bottom (FIG. 8A) or second alignment device (FIG. 8B).

The device used for the bottom as shown in FIG. 8A consists of a support ring 52, having an interior rim 54 and exterior diameter 56 lying in a plane of the ring 52, wherein the interior diameter of the interior rim 54 is less than the outer dimension of the membrane cartridge so as to fit under the bottom and provide additional height to the cartridge when placed in the bowl. Preferably, the interior rim provides an additional 0.0625 to 0.5 inch (1.59 mm to 12.7 mm) of height to the cartridge when positioned within the bowl. More preferably, is from 0.0625 to 0.25 inch (1.59 mm to 6.35 min) in height. More or less height may be designed into the rim 54 depending upon the bowl into which it is inserted. The exterior diameter 56 is equal to or less than the inner diameter of the bowl and equal to or greater than the outer diameter of the cartridge.

The device used for the length of the cartridge as shown in FIG. 8B consists of a support ring 52, having an interior diameter that is equal to or greater than the outer diameter of the cartridge and an exterior diameter 56 lying in a plane of the ring 52, wherein the exterior diameter 56 is equal to or less than the inner diameter of the bowl and equal to or greater than the outer diameter of the cartridge. This allows the device in FIG. 8B to be moved easily along the length of the cartridge to its desired location of use. Additionally, while one such device has been shown mounted along the length of the cartridge, two or more may be used as well particularly with longer length cartridges.

In both embodiments (FIGS. 8A and 8B) the support ring 52 comprises at least one attachment device which interlocks with the cartridge 6 as described above. In this embodiment as shown, the use of snaps or clips 46 is shown although other attachment devices for attaching the alignment device(s) as described above can also be used. As shown, the clip 46 is formed of a first shoulder 58 and a second shoulder 60 and the first shoulder 58 extends obliquely or vertically (as desired) from the support ring 52 and the second shoulder 60 extends perpendicularly from the first shoulder 58 and terminates with the lip 62. Preferably at least a portion of the first shoulder 58 extends at an oblique inward angle toward the center of the ring 52 to provide an addition retention bias or spring effect when in place (not shown).

When used as a bottom attaching device the ring 52 may be closed if desired (not shown) provided, that it is capable of still providing at least the height, and if desired the centering abilities, described above.

Figure 9:
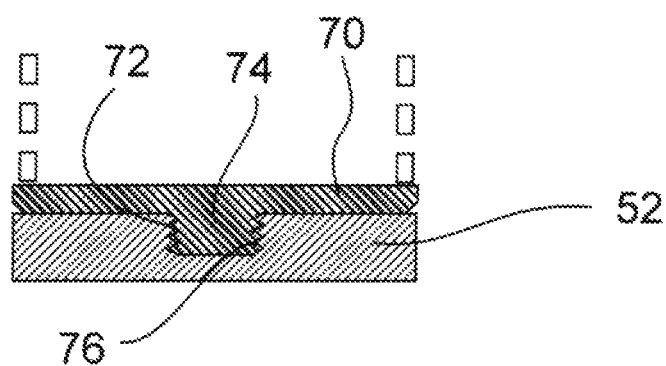
FIG. 9 shows a housing and cartridge containing a fifth embodiment of the present invention in cross-sectional view.

FIG. 9 shows another attachment device for the alignment device when used on the bottom of the cartridge. This requires the use of a special endcap 70 which contains threads 72 (either outward as shown or inward if desired (not shown). The ring 52 is solid except for a recess 74 containing threads 76 capable of mating with those of the endcap 70.

In addition to providing for accurate alignment and installation of the cartridge in the bowl type housing and proper sealing of the end cap of cartridge to the housing in at liquid tight manner, the alignment devices also ensure that the sealing, relationship is maintained, between the cartridge and housing during use even when subjected to pressure fluctuations and the like. The alignment device(s) hold the cartridge in place and any operating pressures imposed on the cartridge do not unseat or push the cartridge out of its sealing relationship with the housing as has happened in the prior art. While not wanting to be bound by any particular theory, the alignment devices take up any slack that might otherwise exist in housing essentially locking the cartridge in place relative to the housing and its components. This ensures that all fluid must pass through the filter before existing the housing and that no bypass due to an unseated cartridge occurs.

Alternatively, the attachment device(s) can be permanently attached to the cartridge or one of its components such as an endcap or molded sleeve if desired. The device(s) can be permanently attached in a variety of ways including but not limited to solvent bonding, overmolding, adhesive bonding, heat or ultrasound bonding and the like.

The selection of filtration, media used within the filtration cartridge can be any of those commonly used in the industry. Typically, the media includes but is not limited to of flat sheet membrane, spiral wound flat sheet membrane, pleated flat sheet membrane, spiral pleated flat sheet membrane, hollow fiber membrane, depth filter media such as spiral wound continuous fiber depth filter media, sintered metal filter media, ceramic media, particulate media containing an active capture material such as resin or ceramic beads or a membrane with ligands for removing selected materials from the fluid attached to their surfaces, ion exchange media such as anion resin, cation resin or mixtures of the two alone or incorporated into a membrane structure and combinations of any of these.

This media may be formed of any material typically used in filtration such as paper, other cellulosic materials such as regenerated cellulose or nitrocellulose, glass fiber and fabric, metal such as stainless steel, nickel, chromium and alloys and blends thereof, ceramics, plastics, preferably thermoplastic materials such as polyolefins, homopolymers, copolymers or terpolymers, including polyethylene such as Ultra-high molecular weight polyethylene, polypropylene and the like, PVDF, PIPE resin, PFA, ECTFE and other fluorinated resins, particularly perfluorinated thermoplastic resins, PVC, nylons, polyamides, polysulphones, modified polysulfones such as polyethersulfones, polyarylsulfones and polyphenylsulfones, polyimides, polycarbonates, PET and the like.

In all of these embodiments the howl and the head may be made of a plastic, preferably a thermoplastic including polyolefins such as polyethylene, ultrahigh molecular weight polyethylene or polypropylene, copolymers or terpolymers of polyolefins, nylons, PTFE resin, PFA, PVDF, ECTFE and other fluorinated resins, particularly perfluorinated thermoplastic resins, polycarbonates, polysulphones, modified polysulphones such as polyethersulfone, polyarylsulfones or polyphenylsulfones; any glass or other reinforced plastic, thermoplastic or thermoset; or a metal such as stainless steel, aluminum, copper, bronze, brass, nickel, chromium or titanium or alloys or blends thereof.

The alignment device(s) may be made of a plastic, preferably a thermoplastic including polyolefins such as polyethylene, ultrahigh molecular weight polyethylene or polypropylene, copolymers or terpolymers of polyolefins, nylons, PTFE resin, PFA, PVDF, ECTFE and other fluorinated resins, particularly perfluorinated thermoplastic resins, polycarbonates, polysulphones, modified polysulfones such as polyethersulfones, polyarylsulfones or polyphenylsulfones; or any glass or other reinforced plastic, whether thermoplastic or thermoset.

EXAMPLE

A first and second alignment devices as shown in FIGS. 8A and 8B according the embodiment shown in FIG. 5 were attached to the bottom and intermediate portion of a 10 inch in length Durapore® membrane cartridge (Millipore Corporation) via the use of clips molded as part of the devices. The clips on the bottom device attached over the rim of the bottom endcap and the dips of the second device attached into the slots in the outer body of the cartridge. The cartridge was then placed into a polypropylene housing bowl (Millipore Corporation) and the cartridge/bowl combination was threaded together via the mating threads on the bowl and housing. The devices were found to align and seat the port orate cartridge in the port of the head in a liquid tight manner.

What is claimed:

1. A removably attached alignment device suitable for seating a filter cartridge within a housing bowl, the filter cartridge having a porous cartridge body, a porous core, a filter material between the body and the core, a first endcap being liquid tight sealed to a first end of the body and a first end of the core, a second endcap having an opening alignable with the core, the second endcap being liquid tight sealed to a second end of the body and the opening being liquid tight sealed to the core such that fluid entering the porous cartridge body must flow through the filter material before reaching the core and must flow through the core before reaching the opening; the alignment device comprising a first removably attached alignment device secured only to an outer surface of the body adjacent the first endcap of the filter cartridge and a second removably attached alignment device secured only to a portion of the body of the filter cartridge at a location intermediate between the first and second ends of the filter cartridge; wherein the first and second alignment devices comprise a height sufficient to cause the filter cartridge to seat in a housing head and a width sufficient to center the filter cartridge within the housing bowl, when assembled and wherein the first alignment device has a support ring having an interior rim and an interior and exterior diameter lying in a plane of the ring, wherein the interior diameter of the interior rim is less than the outer dimension of the first endcap of the filter cartridge, the support ring comprises at least one member projecting from the plane of the ring wherein the member comprises a lip which interlocks with the filter cartridge, and the second alignment device having a support ring having an interior and exterior diameter lying in a plane of the ring, wherein the interior diameter is greater than the diameter of the filter cartridge, and the exterior diameter is less than the diameter of the housing structure; and wherein the support ring comprises at least one member projecting from the plane of the ring wherein the member comprises a lip which interlocks with the filter cartridge, such that the alignment device is only attached to an outer surface of the filter cartridge and the exterior diameter of the alignment device merely centers the filter cartridge within the housing structure.

2. The device of claim 1 wherein when the filter cartridge with the first and second alignment devices is placed into a bowl-type housing, the filter cartridge is centered within the bowl and is of a height sufficient to ensure a liquid tight mating of the opening of the second endcap with a corresponding opening in the housing by the first and second alignment devices.

3. The device of claim 1, wherein the first alignment device being of a height sufficient to cause the opening of the second endcap to liquid tight seal into an opening of a housing head when the head and bowl are mated.

4. The device of claim 1, wherein the member of each of the first and second alignment devices further comprises a first and a second shoulder, and wherein the first shoulder extends obliquely from the support ring and the second shoulder extends perpendicularly from the first shoulder and terminates with the lip.

5. An alignment device suitable for mounting a filter cartridge in a housing structure, the filter cartridge having a body with a first end and a second end, the first end having a first endcap liquid tightly sealed to the first end of filter cartridge and the second end having a second endcap containing a port to an interior of the filter cartridge sealed to the second end of the filter cartridge wherein the alignment device comprises a first and a second removably attached alignment device, the first alignment device being secured to an outer surface of the filter cartridge adjacent the first endcap of the filter cartridge, the first alignment device having a support ring having an interior rim and an interior and exterior diameter lying in a plane of the ring, wherein the interior diameter of the interior rim is less than the outer dimension of the first endcap of the filter cartridge, the support ring comprises at least one member projecting from the plane of the ring wherein the member comprises a lip which interlocks with the filter cartridge, such that the alignment device is only attached to an outer surface of the filter cartridge, the second alignment device being secured to an outer surface of the filter cartridge at a location between the first endcap and the second endcap, the second alignment device having a support ring having an interior and exterior diameter lying in a plane of the ring, wherein the interior diameter is greater than the diameter of the filter cartridge, and the exterior diameter is less than the diameter of the housing structure; and wherein the support ring comprises at least one member projecting from the plane of the ring wherein the member comprises a lip which interlocks with the filter cartridge, such that the alignment device is only attached to an outer surface of the filter cartridge and the exterior diameter of the alignment device merely centers the filter cartridge within the housing structure.

6. The device of claim 5 wherein the member of each of the first and second alignment devices further comprises a first and a second shoulder.

7. The device of claim 5, wherein the member of each of the first and second alignment devices further comprises a first and a second shoulder, and wherein the first shoulder extends obliquely from the support ring and the second shoulder extends perpendicularly from the first shoulder and terminates with the lip.

* * * * *